United States Patent [19]

Elkins et al.

[11] 4,058,221

[45] Nov. 15, 1977

[54] WINDOW RACK

[76] Inventors: Johnny C. Elkins, 120 W. 4th St.;
Marvin C. Hanz, 423 S. Irving, both
of San Angelo, Tex. 76901

[21] Appl. No.: 696,303

[22] Filed: June 15, 1976

Related U.S. Application Data

[63] Continuation of Ser. No. 256,509, May 24, 1972, abandoned.

[51] Int. Cl.² .......................... A47F 5/08; A47F 7/00
[52] U.S. Cl. ........................................ 211/87; 211/64; 224/42.45 R
[58] Field of Search ............... 211/87, 64, 63, 60 SK, 211/103; 224/42.45 A, 42.45 R, 42.42 R; 248/205 A; 85/15, 21

[56] References Cited

U.S. PATENT DOCUMENTS

| 339,006 | 3/1886 | Newman | 85/21 X |
|---|---|---|---|
| 2,498,139 | 2/1950 | Simjian | 248/205 A X |
| 2,536,293 | 1/1951 | Koses | 211/87 X |
| 2,550,796 | 5/1951 | Francis | 211/87 X |
| 2,599,824 | 6/1952 | Griffin | 211/87 |
| 2,746,661 | 5/1956 | Kaplan | 224/42.45 A |
| 3,007,582 | 11/1961 | Lindstrom | 211/87 |
| 3,294,247 | 12/1966 | Norrington | 211/64 |

Primary Examiner—Ramon S. Britts
Attorney, Agent, or Firm—Marcus L. Bates

[57] ABSTRACT

A rack for supporting objects from a window and gasket assembly. The rack is comprised of first and second elongated support members which are placed together in overlapping relationship so as to enable each member to be adjustably moved relative to the other so that a blade formed at each free depending end of the members can be inserted under the gasket adjacent to the window glass where the gasket holds the member so that objects can be supported from the rack.

Outwardly extending teeth penetrate the gasket and maintain the rack stationary relative to the window.

12 Claims, 7 Drawing Figures

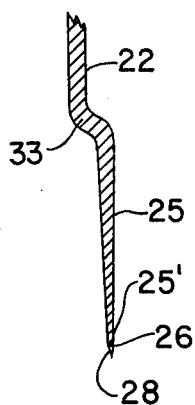
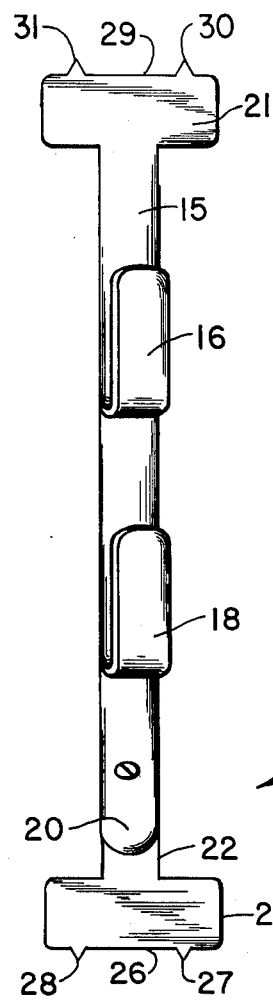
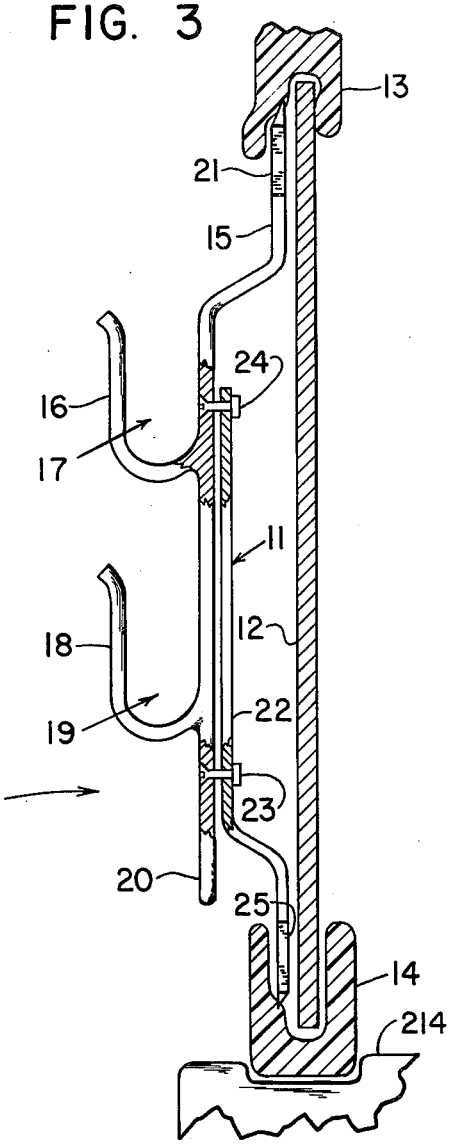
FIG. 4
FIG. 2
FIG. 3
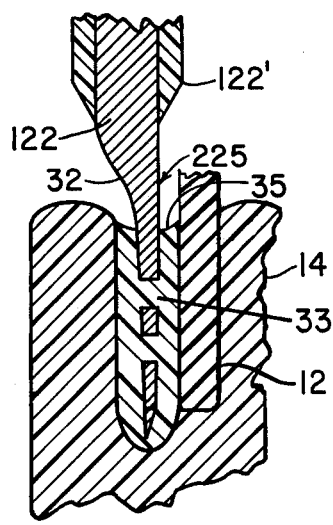
FIG. 5
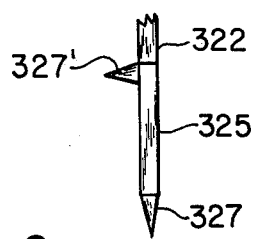
FIG. 7
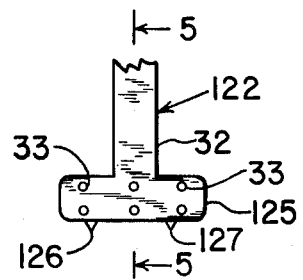
FIG. 6
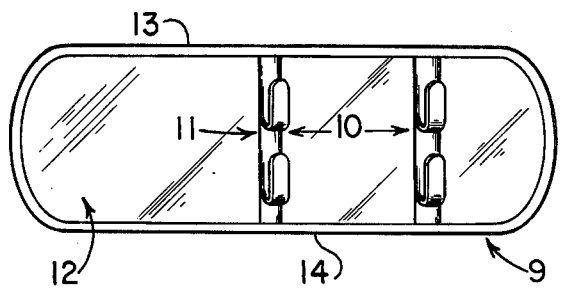
FIG. 1

WINDOW RACK

RELATED APPLICATION

This is a continuation of application Ser. No. 256,509, filed in May 24, 1972, now abandoned.

BACKGROUND OF THE INVENTION

Racks for supporting objects within vehicles are generally old in the art as evidenced by gun racks and the like which may be purchased and bolted onto structure adjacent to a window. In order to bolt the rack securely in place, it is necessary to drill or punch holes so that sheet metal screws may be used to secure the rack to the vehicle. The drilling and punching of holes is objectionable to most people because it defaces the vehicle and should the rack subsequently be removed, the visually observable holes reduce the value of the vehicle.

The rear window assembly of a pickup truck includes a glass secured within a metal window frame by a large rubber gasket. Pickups have a minimum of space within the cab and for this reason it is not unusual for one to attach a gun rack adjacent to the rear window by screwing the gun rack in place in the beforedescribed manner. For this reason it is desirable to utilize racks adjacent to the rear window of a pickup for supporting objects other than fire arms.

Many people have neither the ability nor the tools with which they can form the necessary screw holes for attachment of a rack to their vehicle; moreover, those who are blessed with the ability and who own the necessary tools find the task time consuming and often are displeased with the results, especially when one rack is misaligned with the other. Furthermore, from time to time, the sheet metal screws holding the rack will loosen and must be tightened. Sometimes the holes become enlarged from wear and oversized screws must be used. Should the screws jar loose, valuables such as expensive firearms will fall to the floor of the vehicle, or else objects held by the rack may become scattered among the occupants seated therein.

Accordingly, it is desirable to be able to attach a rack adjacent to the window of a vehicle in a simple and convenient manner which avoids the necessity of drilling or punching holes into the vehicle structure. It is also desirable to be able to attach a rack to the window assembly of a vehicle in a manner which requires little mechanical ability.

SUMMARY OF THE INVENTION

This invention relates to a rack in combination with a window and gasket assembly of a vehicle wherein opposed portions of a gasket which defines the edge portion of the window glass are used for mounting the rack in supporting relationship to the assembly.

The rack includes first and second members having opposed marginal end portions joined together in overlapping relationship with the remaining end portions oppositely depending therefrom and made into the form of a free depending blade. The blades are thin in cross-section and can be slidably received between one face of the gasket and one face of the glass with opposed faces of the blade bearing against one face of the glass and one face of the interior of the gasket.

The blade is provided with teeth which may be embedded into the gasket to secure the rack from movement. The blade can also be apertured so that cement placed upon either side thereof flows through the apertures and adheres to the gasket thereby effectively riveting the blade to the gasket.

A primary object of this invention is to provide a rack for supporting objects from the window of a vehicle in a new and unobvious manner.

Another object of the invention is to provide a rack assembly for supporting objects from a window and gasket assembly of a vehicle.

A further object of this invention is to provide a rack attached to the gasket of a window assembly of a vehicle.

A still further object of this invention is to disclose and provide a rack which can be rapidly affixed to the gasket of a window assembly of a vehicle.

Another and still further object of this invention is to provide a rack in combination with the window glass and gasket of a rear window assembly of a vehicle.

An additional object of this invention is to provide improvements in racks which can be readily affixed to the gasket of a window assembly of a vehicle.

These and various other objects and advantages of the invention will become readily apparent to those skilled in the art upon reading the following detailed description and claims and by referring to the accompanying drawings.

The above objects are attained in accordance with the present invention by the provision of apparatus fabricated in a manner substantially as described in the above abstract and summary.

BRIEF DESCRIPTION OF THE DRAWINGS

FIG. 1 is a side elevational view of a window and gasket assembly of a vehicle with racks made in accordance with the present invention being disposed thereon;

FIG. 2 is an enlarged detailed front elevational view of a rack made in accordance with the present invention;

FIG. 3 is a fragmentary, part cross-sectional, side view which discloses the present invention in its operative configuration;

FIG. 4 is an enlarged, fragmentary, cross-sectional representation of part of the apparatus seen in the foregoing figures;

FIG. 5 is an enlarged, fragmentary, cross-sectional representation of another embodiment of the present invention;

FIG. 6 is a reduced, fragmentary, plan view of part of the apparatus disclosed in FIG. 5; and, FIG. 7 is a reduced, fragmentary, side view of another form of the invention.

DETAILED DESCRIPTION OF THE DRAWINGS

Disclosed in FIG. 1 is a window and gasket assembly 9, such as the rear window of a pickup truck, for example, having spaced apart racks 10 affixed thereto with the racks being disclosed as being in the form of apparatus for supporting thereon a fire arm, such as a rifle or shot gun, and accordingly will hereinafter be referred to as a "gun rack."

The rack 11 is seen to be placed adjacent to face 12 of a glass window; i.e., a sheet of glass such as found on the rear of a pickup truck. The window is usually removably and supportingly received with a circumferentially extending gasket having opposed marginal portions 13 and 14, with the gasket being affixed to a window frame 214 in any convenient manner.

The rack is comprised of a first elongated support member 15 which receives two opposite bends in order to displace the intermediate portion of the rack away from the window glass. Spaced apart support member 16 terminates in the form of an upwardly opening hook thereby leaving a cradle area 17 for bottom supporting a fire arm therein. Underlying the cradle is a second upwardly bent member 18 forming a cradle 19 for supporting a second fire arm therein. Other cradles may be provided in underlying relationship relative to cradle 19 if deemed desirable.

The first member has opposed end portions 20, 21 with end portion 21 being reduced in thickness along a marginal free end portion thereof so as to form a blade, while opposed marginal end portion 20 is superimposed upon a marginal end portion of a second elongated support member 22, with the first and second members cooperating together to form a rack.

The second support member is adjustably affixed to the first support member by the illustrated fastener means 23, 24 which may be placed in any number of matching apertures so that the distance between opposed blades 21, 25 may be adjusted to conform to the distance between the spaced apart lengths of the gasket.

The second support member has a lowermost edge portion 26 from which there outwardly depends teeth 27, 28 with the teeth being sufficiently sharp to penetrate a rubber gasket when forced thereinto.

The blade of the first support member likewise terminates at edge portion 29 with the teeth 30, 31 outwardly depending therefrom. Where deemed desirable a sufficient number of teeth may be formed in the blade to give the appearance of serrations.

As illustrated in FIG. 4, the blade 22 can be curved at 33 so that face 25 is parallel to and can be brought to bear against the face of the window glass.

As illustrated in the embodiment of FIGS. 5 and 6, apertures 33 admit cementitious material therethrough so that the material effectively bonds the blade to the gasket. Where deemed desirable, portions of the rack may be dipped or otherwise coated with rubber or rubber-like material 122' so that objects placed on the rack will not be marred as they are supported thereon.

As illustrated in FIG. 7, teeth may be disposed parallel to the blade at 327 as well as being disposed normal to the blade at 327'.

The rack is installed by sliding blade 21 under gasket portion 13 with the face 25 of the blade being brought to bear against the inner face of the window glass. The second member is inserted under one edge portion of the opposed gasket 14 in a similar manner, with the marginal ends of the members being superimposed upon one another in overlapping relationship so that the fasteners can be inserted through the apertures provided therein.

Where the vehicle traverses extremely rough terrain, it is sometimes advantageous to provide the illustrated teeth 27, 28, 31 or 327, 327' on each of the blades so as to prevent lateral movement of the rack relative to the vehicle.

Alternatively, epoxy cement can be squeezed into the area between the gasket and the glass in the illustrated manner of FIG. 5 so that the blade is firmly cemented into place. It will be noted that apertures 33 effectively provide for a rubber-like rivet since the cement is extruded therethrough and adheres to the rubber gasket.

The area and configuration of the blade 25 can be adjusted to provide for sufficient bearing pressure for supporting a considerable amount of weight beyond that imagined because of the manner in which the load is transferred into the window frame. The rack can be made of steel or plastic, and when steel is selected, it is preferred to provide a generous thickness of rubber or plastic-like material 122' on the surface thereof so as to prevent damage to objects placed thereon.

Where deemed desirable, a box can be substituted for the illustrated cradles of FIGS. 1-3 with the box being attached to each of the illustrated spaced apart racks. This expedient is especially desirable when the rack is utilized in a pickup truck in view of the limited storage space provided by the cab of such a vehicle.

As another embodiment of the invention, especially when fabricating the rack from plastic, members 15 and 16 may be made into a flat configuration which is disposed normal to member 21 so as to present a rigid lightweight construction. Members 18 and 22 are fabricated in a similar manner, with portions 20, 22 slidably abutting one another. Portions 20, 22 may be provided with a tongue and groove arrangement so as to enable a single fastener 23 to affix the two coacting members of the rack together. This novel design permits installation of the rack to be rapidly carried out in less than one minute.

We claim:

1. A rack assembly for supporting guns from a window and gasket assembly of a vehicle, comprising:
    first and second elongated support members;
    each of said support members having opposed end portions; means by which one said opposed end portion of said first member is adjustably affixed in overlapping relationship with respect to one opposed end portion of said second member thereby leaving free opposed ends depending from said rack assembly;
    the marginal end portion of each said free opposed end being reduced in thickness and disposed in a common plane; teeth affixed to each said free opposed end for engaging the gasket of a window; said teeth are placed substantially normal to said marginal end portion of said member; each said free opposed end adapted to be placed between the window and the gasket so that the gasket supports the rack; and means affixed to said first and second elongated support members for supporting guns therefrom.

2. A rack assembly for supporting guns from a window and gasket assembly of a vehicle, comprising:
    first and second elongated support members;
    each of said support members having opposed end portions; means by which one said opposed end portion of said first member is adjustably affixed in overlapping relationship with respect to one opposed end portion of said second member thereby leaving free opposed ends depending from said rack assembly;
    the marginal end portion of each said free opposed end being reduced in thickness and disposed in a common plane; said reduced marginal end portion is provided with perforations to enable cementitious material to be placed therein so as to affix said end portion to the gasket; each said free opposed end adapted to be placed between the window and the gasket so that the gasket supports the rack; and means affixed to said first and second elongated support members for supporting guns therefrom.

3. In combination with a window and gasket assembly wherein the window is mounted in fixed relationship relative to the gasket and has opposed edge portions which are supported in fixed relationship relative to a window frame by opposed portions of the gasket, a pair of spaced gun racks;

each of said gun racks having means thereon for jointly supporting a gun therefrom; each of said racks including a first member and a second member;

each said member having opposed end portions; means by which one marginal end portion of said first member is adjustably affixed in overlapping relationship relative to one marginal end portion of said second member;

said first and second members of each gun rack having opposed end portions depending away from one another, the marginal end portions of said depending opposed members being reduced in thickness and increased in width to form a blade of a configuration to enable a marginal end portion of said blade to be received between the gasket and window with said gun rack being bottom supported by said lower blade member;

and further including teeth affixed to said remaining opposed ends for engaging the gasket of the window;

said teeth are placed substantially normal to said reduced marginal end portion of said member.

4. In combination with a window and gasket assembly wherein the window is mounted in fixed relationship relative to the gasket and has opposed edge portions which are supported in fixed relationship relative to a window frame by opposed portions of the gasket, a pair of spaced gun racks;

each of said gun racks having means thereon for jointly supporting a gun therefrom; each of said racks including a first member and a second member;

each said member having opposed end portions; means by which one marginal end portion of said first member is adjustably affixed in overlapping relationship relative to one marginal end portion of said second member;

said first and second members of each gun rack having opposed end portions depending away from one another, the marginal end portions of said depending opposed members being reduced in thickness and increased in width to form a blade of configuration to enable a marginal end portion of said blade to be received between the gasket and window with said gun rack being bottom supported by said lower blade member;

and further including teeth affixed to said remaining opposed ends for engaging the gasket of the window;

said teeth are placed substantially normal to said reduced marginal end portion of said member; said reduced marginal end portion is provided with perforations so as to enable cementitious material to be placed therein so as to affix the end portion to the gasket.

5. In combination with a window glass and a resilient gasket assembly wherein the window glass is mounted in fixed relationship respective to the gasket by capturing opposed marginal edge portions of the window glass within a groove formed within the gasket, with the gasket having opposed edge portions which are supported in fixed relationship respective to a window frame, a pair of spaced gun racks supported solely by said resilient gasket assembly and said window glass;

each rack of said pair of spaced gun racks having cradle means formed thereon for at least partially supporting a gun therefrom; each said rack including a first member and a second member, said first and second member having opposed end portions;

means by which a marginal end of one said opposed end portion of said first member is adjustably affixed in overlapping relationship respective to a marginal end of one said opposed end portion of said second member, thereby leaving opposed end portions extending away from one another;

marginal opposed end portions of said opposed end portions which extend away from one another being reduced in thickness and increased in width to form a generally flat blade member being devoid of shoulders and the like, said marginal end portion of each of said blade members being received between said resilient gasket and window glass with the terminal end of each said blade member bearing solely against the gasket, said blade members of said first and second members providing the sole support for said rack.

6. In combination with a window glass and gasket assembly of a vehicle wherein the window glass is resiliently mounted in fixed relationship respective to the gasket, a gun rack assembly;

said gun rack assembly comprising spaced apart racks, each said spaced apart rack having a first and second elongated support member;

said first and second elongated support member each having opposed end portions; means by which one of said opposed end portions of said first member is adjustably affixed in overlapping relationship with respect to one opposed end portion of said second member thereby leaving opposed ends extending from the overlapping portion of said rack;

the marginal end portion of each of said opposed ends which extend from the overlapping portion of said rack are progressively reduced in thickness and enlarged in width to form a tapered blade member having generally flat faces and being devoid of shoulders and the like, each said blade member being disposed in a common plane with one of said generally flat faces bearing against said window glass; each said blade member being placed between the window glass and the gasket; said blades having a terminal end portion which engages solely said gasket, so that the blade member engages both the window glass and the gasket at all times to provide the sole support for the rack; and, cradle means affixed to each said rack for supporting a gun therefrom.

7. In combination with a window glass and gasket assembly of a vehicle wherein the window glass is resiliently mounted in fixed relationship respective to the gasket, a rack assembly comprising a first and second elongated support member;

each of said support members having opposed end portions; means by which one said opposed end portion of said first member is adjustably affixed in overlapping relationship with respect to one opposed end portion of said second member thereby leaving free opposed ends depending from said rack assembly;

the marginal end portion of each of said free opposed ends being reduced in thickness and enlarged in width to form a generally flat blade being devoid of shoulders and the like, with each blade being disposed in a common plane and bearing against said window glass; each said free opposed end having a terminal end and being placed between the window glass and the gasket with said terminal end engaging solely said gasket, the blade engaging solely the window glass and the gasket at all times to support the rack; means affixed to said first and second elongated support members for jointly supporting objects therefrom.

8. The combination of claim 7 wherein the window glass is captured within a groove of the gasket and each said free opposed end of each said support member of said rack assembly includes said terminal end which abutingly engages the inner surface of the groove of the gasket while the free end which is reduced in thickness has a face which bears against an inside surface of the groove of the gasket in a manner to urge each said free opposed end of each said support member against the glass.

9. The combination of claim 7 wherein each said opposed end of said rack assembly includes opposed faces and said terminal end, said terminal end engages the gasket to prevent downward movement of said rack assembly, one of said opposed faces abutingly engages an inner part of the gasket to thereby prevent lateral inward movement of the rack assembly while the remaining of said opposed faces abutingly engages the inner surface of the glass thereby preventing lateral outward movement of the rack assemble.

10. In a window glass which is resiliently mounted in fixed relationship to a vehicle by a gasket assembly such that the gasket captures the opposed outer marginal edges of the window glass therein, the combination with said window glass and gasket of a rack assembly;

said rack assembly comprises first and second elongated support members; each said support member includes opposed ends; means by which one said opposed end of one support member is adjustably affixed in overlapping relationship with respect to one said opposed end of the remaining support member thereby leaving free opposed ends depending from each support member of said rack assembly;

the marginal end of each said free opposed end being reduced in thickness and disposed in a common plane; each said free opposed end defining opposed flat faces being devoid of shoulders and the like and being of a thickness to enable said free opposed end to be received between the window glass and the gasket, said free opposed ends being disposed between said window glass and said gasket, each said free opposed end including a terminal end bearing solely against said gasket, the gasket and window glass providing the sole means for engagement and support of the rack;

and means affixed to said first and second elongated support members for supporting articles therefrom.

11. The combination of claim 10 wherein said terminal end abutingly engages the gasket while one said face of the free end which is reduced in thickness bears against an inner surface of the gasket in a manner to urge the remaining face of said free opposed end against the glass.

12. The combination of claim 10 wherein a marginal edge of the glass is captured within a groove formed about the inner periphery of the gasket, said terminal end engages an inner surface of the groove of the gasket to prevent downward movement of said rack assembly, one of said opposed faces abutingly engages an inner part of the groove of the gasket to thereby prevent lateral inward movement of the rack assembly while the remaining of said opposed faces abutingly engages the inner surface of the glass thereby preventing lateral outward movement of the rack assembly.

* * * * *